United States Patent [19]

Brenner

[11] Patent Number: 5,601,706

[45] Date of Patent: Feb. 11, 1997

[54] SEWAGE TREATMENT APPARATUS INCLUDING AGGREGATE SEPARATOR

[75] Inventor: Horst Brenner, Breslauer Str. 14, D-71717 Beilstein, Germany

[73] Assignee: Horst Brenner, Beilstein, Germany

[21] Appl. No.: 495,685

[22] PCT Filed: Feb. 1, 1994

[86] PCT No.: PCT/DE94/00095

§ 371 Date: Jul. 24, 1995

§ 102(e) Date: Jul. 24, 1995

[87] PCT Pub. No.: WO94/17917

PCT Pub. Date: Aug. 18, 1994

[30] Foreign Application Priority Data

Feb. 6, 1993 [DE] Germany .............................. 9301654 U

[51] Int. Cl.⁶ ......................................................... B01D 21/00
[52] U.S. Cl. ...................... 210/172; 210/257.1; 210/262; 210/534; 210/540
[58] Field of Search ................................. 210/172, 257.1, 210/259, 262, 528, 521, 532.1, 534, 535, 540, 195.1

[56] References Cited

U.S. PATENT DOCUMENTS 4,927,543  5/1990  Bablon et al. ..................... 210/534
5,244,573  9/1993  Horisawa ........................... 210/535
5,250,196  10/1993  Bosch ............................... 210/257.1

FOREIGN PATENT DOCUMENTS

| 62339 | 10/1982 | European Pat. Off. . |
| 2617837 | 11/1977 | Germany . |
| 2846973 | 4/1980 | Germany . |
| 3009244 | 9/1981 | Germany . |
| 3027503 | 2/1982 | Germany . |
| 9100177 | 5/1991 | Germany . |
| 9208671 | 10/1992 | Germany . |

OTHER PUBLICATIONS

Riker, Rudolf "New Methods for Reprocessing Leftover and Returned Concrete" from Betonwerk und Fertigteil Technik vol. 49, No. 9 Sep. 1983 pp. 569–573.

*Primary Examiner*—Christopher Upton
*Attorney, Agent, or Firm*—Anderson Kill & Olick P.C.

[57] ABSTRACT

An apparatus for treating of sewage or waste water comprises an aggregate separator (30, 32, 34). The apparatus includes a waste water reservoir (12), a device (22) for circulating the waste water (16) in the reservoir (12), and a replenishing chamber (38) for the waste water containing the aggregate. The apparatus is characterized in that there is provided at least one settling tank (66) into which the waste water contained in the waste water reservoir (12) can be delivered through a conduit (64), and in that a further conduit (82, 90) is provided between the settling tank (66) and a concrete mixer (61).

14 Claims, 1 Drawing Sheet

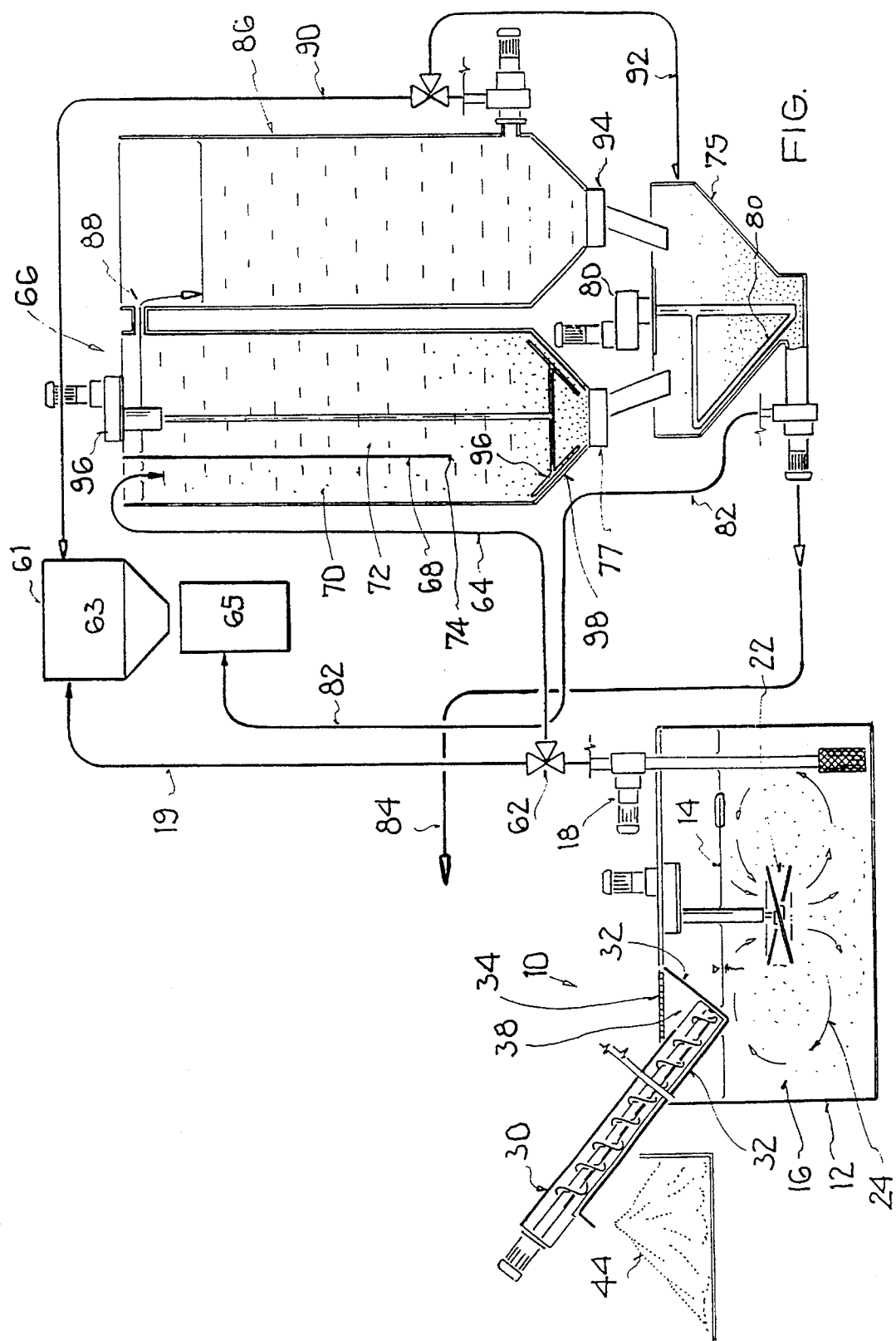

SEWAGE TREATMENT APPARATUS INCLUDING AGGREGATE SEPARATOR

TECHNICAL FIELD

The invention relates to an apparatus for treating sewage or waste water. The apparatus also includes an aggregate separator. For conservation reason and, in particular, from economical considerations, apparatuses for reprocessing residual concrete are used in ever increasing number. They are used as in concrete production so in concrete transportation operations. These apparatuses should prevent the concrete residues and/or the cement slurry from penetrating into open sewerage and/or from regular accumulation in greater or lesser extent somewhere at constructional sites. Such apparatuses retrieve sand or pebbles contained in the concrete residue and provide for re-use of the cement slurry-water, contained in the cement residue, for production of a new concrete, and therefore, these materials are subjected to recycling.

STATE OF THE ART

Utility model DE-G 9100177 discloses a washing trough for a beton residue. This washing trough serves for reprocessing of the beton residue. The trough includes a chamber for a preliminary wash and a chamber for fine wash arranged one after another in the flow direction in a reservoir-like housing. Fresh water is supplied in the trough in a direction opposite to the direction of flow of material, so that optimal washing results are achieved. At the end of the fine wash chamber, sand and pebbles, extracted from the beton residue, are loaded, in waterfall manner, onto a screw conveyor with a bucket wheel and are carried away from the washing trough. The conveyor trough of the screw conveyor is formed of a high wear-resistant plastic material so that tilting of sand and pebble components between the conveyor screw and the surrounding housing and thereby jamming of the particles between separate structural parts is not possible. Thereby, a reliable transportation of the sand and pebble pieces out of the washing trough becomes possible. By using the plastic band, the conveyor screw can be operated very quietly.

Such washing troughs, because of their overall concept, are particularly suitable for operations in which a relatively large amount of a concrete residue is produced. An example of such an operation is transportation of concrete, in which often about ¼ m$^3$ and more of the concrete residue remains in the concrete transporting vehicle when it returns from its delivery run. Thereby, during a day period, a relatively large amount of the concrete residue is obtained.

However, from the economical point of view, such washing troughs are not very efficient when relatively small amount of the concrete residue in comparison with the amount of water, remains. Such is the case during production of concrete at concrete plants. There, the amount of water which is used, e.g., for rinsing during the production of a concrete batch and which, as a result, is contaminated with cement slurry, is very large in comparison with the concrete residue. The use of conventional washing troughs is generally possible, and they permit to achieve the same technical advantages as with recycling of the residual concrete, however, the investment costs are relatively high, and operation of this washing troughs is not particularly effective.

Utility model DE-G 92 08 671 discloses an apparatus of the type, discussed at the beginning, suitable for treating waste water and which further includes an aggregate separator. This apparatus includes a waste water reservoir in which a device for circulating the waste water, which fills the reservoir, is provided. Above the level of the waste water, which fills the reservoir, there is provided a replenishing chamber for the aggregate-containing waste water. This apparatus is particularly suitable for production industry where regularly a large amount of waste water relatively to the produced concrete residue is obtained. Here, the waste water means water which is contaminated with cement slurry. The sand and pebble parts, contained in the concrete residue, do not accumulate in the waste water reservoir but are carried away from the replenishing chamber, which is arranged above the waste water reservoir, by a discharge device. As a discharge device, e.g., a screw conveyor, can be used, such as shown in the above-discussed utility model G 92 08 671.

The waste water accumulated in the waste water reservoir can be used in production of fresh concrete. However, during the production of the fresh concrete, it is necessary to add additional clean water. As a result, the concrete production industry requires a large amount of fresh water. This fresh water should be supplied to mixers and is consumed at the production of concrete, despite the availability of waste water.

DESCRIPTION OF THE INVENTION

Proceeding from this state of the art, the object of the invention is to minimize the water consumption in the concrete production industry. The invention is defined by the features of claim 1. An advantageous embodiment of the invention and further development thereof are the subject matter of the sub-claims.

The apparatus according to the invention is based on a recognition that by providing, in addition to the waste water reservoir, downstream thereof, a water clarification plant, the waste water, accumulated in the waste water reservoir, can be further clarified so that it, as so-called clean water, can be used, in the same manner as the fresh water, in concrete production, and/or with similar consumers, or for rinsing purposes. Thereby, the waste water accumulated in the waste water reservoir can be completely re-used in production industries which consume large amount of fresh water.

It proved to be advantageous to form the downstream clarification plant as a settling tank. Then, the clarification plant can consist of at least one settling tank. In this settling tank which, preferably, is formed above ground as a bin, there is provided force circulation of the clarified waste water such that the waste water must flow downward through the settling tank and then can flow from the lower region of the tower again upward. By this circulation of the waste water, the contamination particles, such as cement particles and fine sand, present in the water are deposited on the bin bottom. Therefore, it makes sense to provide in the clarification bin a stirrer, so that no caking can be formed on the bin bottom cone and which can block the bin bottom outlet. In the upper region of the bin then practically clean clarified water is present. This clarified water can, in the same manner as fresh water, be used in concrete production. In addition, it is possible to use this clarified water for rinsing purposes.

It proved further to be advantageous to store the clarified water, which accumulated in a settling tank or tanks, in a downstream located water storage. In this manner, the clarified water can be produced in large amounts without any problems and without fear that the contamination particles, accumulated in the lower region of the settling tank, could whirl up and again contaminate the clarified water. According to a further development of the invention, a further container is provided beneath the settling tank and which serves for reception of small contamination particles settled in the settling tank. There the contamination particles accumulated in the further container can be retained in a movable condition with a stirrer or a kneading element, so that the consistency of the more or less mushy mass present in the container does not change. The mass of fine sand and cement, which is accumulated in the container, can be delivered, by a thick matter pump, to a concrete mixer as an aggregate substitute, whereby a completely closed material cycle is obtained. In case the mushy mass becomes to thick, clarified water from the settled tank or the downstream storage can be added.

The apparatus according to the invention permits to discharge the waste water from the waste water reservoir sufficiently enough, so that the treatment of the concrete residue and/or aggregate-containing water can be effected at any time. The contaminated water accumulated in the waste water reservoir can be delivered either directly to a mixer for the production of concrete or pumped into the settling tank.

In the latter case, a further advantage consists in that the clarified water obtained in the settling tank can be used as a substitute for fresh water required for the production of concrete. Thereby, the amount of fresh water, which is required for the production of concrete, is substantially reduced.

Further embodiments and advantages of the invention are defined by features recited in the claims and become clear from the description of an embodiment example below. The features of the claims can be combined in any arbitrary manner, inasmuch as they do not obviously mutually exclude one another.

BRIEF DESCRIPTION OF THE DRAWING

The invention will be described and explained in detail below on a basis of an embodiment example. The single FIGURE shows schematically an apparatus according to the invention for treatment of waste water and including an aggregate separator.

MEANS FOR EFFECTING THE INVENTION

An apparatus 10 for treating waste water which contains aggregate, includes a so-called waste water reservoir 12. The reservoir 12 can be manufactured from any materials.

The waste water 16 fills the reservoir 12 to a level 14. The waste water 16 is water contaminated with cement and fine sand and is obtained during production of concrete in mixing apparatuses or during transportation of the concrete. The waste water 16 can be re-used during the production of concrete and is, therefore, recycled. To this end, the waste water 16 is sucked by a pump 18, which can be formed as a submerged pump, and is then delivered into conduit 19 leading to a mixer 61.

From above, a discharge device 30 extends into the reservoir 12 and which also can be spaced from the reservoir 12. The discharge device 30 has, at its lower region which projects into the reservoir 20, a bottom or wall-like separation wall 32. The separation wall is formed, in the region of the reservoir 12, as a sieve and, thus, enables water to pass therethrough. From above, the separation wall 32 is covered with a grid 34. The space 36, which is limited by the separation wall 32 and the grid 34 forms a replenishing chamber 38 for the concrete residue or for the water containing cement. The discharge device 30 is formed as a screw conveyor which, together with the separation wall 32 and the grid 34, form the aggregate separator. The aggregate separator can also be formed as a known washing trough. In this case, the reservoir 12 forms a buffer station for excessive accumulated water.

The discharge device 30 provides for transporting from the reservoir 12 the aggregate, such as sand and pebbles, which accumulates in the replenishing chamber 38. The sand and pebbles, which are delivered from the reservoir 12 by the discharge device 30, are shown in the drawing with dash line and are designated with a reference numeral 44. The discharge device shown in the drawing is preferably formed as a screw conveyor, as described in G 92 08 671.

The waste water, which is located beneath the replenishing chamber 38 of the discharge device 30 in the reservoir 12, is agitated with a stirrer 22 submerged into the waste water 16. The stirrer 22 circulates the waste water 16 from above downward, as shown schematically by arrows 24. This prevents the deposition of fine cement components, which are contained in the waste water 16, on the bottom and/or walls of the reservoir 12. Instead of the stirrer 22, any other suitable circulating device can be used.

The conduit 19, which leads from the reservoir 12 to a mixer 61, e.g., a mixer scale 63, is provided with a three-way valve 62 which is also connected by a conduit 64 with a vertical settling tank 66. The conduit 64 extends into the settling tank 66 from above. It is also possible for the conduit 64 to open directly into the reservoir 12. In this case, a second pump would be required. This pump could withdraw the waste water 16, when its quantity in the reservoir 12 is at maximum, into the settling tank 66.

The settling tank 66 has a longitudinal wall 68 extending from above downward. This longitudinal wall 68 could be formed by an internal pipe (Portmund tank). The longitudinal wall 68 connects opposite outer wall regions of the settling tank 66. Thereby, in the inner space of the settling tank 66, a left region 70 and a right region 72 are formed, which are connected with each other by a space located beneath the longitudinal wall 68. Therefore, the water, delivered into the settling tank 66 by the conduit 64, passes downward through the region 70. After passing the lower edge 74 of the longitudinal wall 68, the water can flow upward through the region 72. During this flow, the fine particles, which consist of cement and small fine sand particles, are separated from the clarified water and accumulate in the lower region of the settling tank 66. By opening, e.g., a transverse shutter 77, provided at the bottom of the settling tank, this fluid mass can be withdrawn from the settling tank 66 and delivered into a container 75. This withdrawn mass would have more or less mushy consistency. A kneading device 80, provided in the container 75, would maintain this consistency. This mushy mass can be supplied in portions through a conduit 82 to a mixer 65 arranged beneath the mixer scale 63, if desired. The mushy mass can also be carried away through another conduit 84.

In this case, another stirrer 96 is provided in the settling tank 66, with which the bottom delivery cone 98 can be kept clear.

The settling tank 66 is associated with a further tower 86 which serves as a water storage. Clarified water flows into the water storage 86 through an overflow passage 88 provided in the upper portion of the region 72 of the settling tank 66. This clarified water is accumulated in the region 72. From the water storage 86 can either flow the conduit 90 to the mixer 61, as a fresh water substitute, or flow into the container 75 through the conduit 92. This would be the case if the mushy consistency in the container 75 became too solid.

In the case of a color concrete, there exists a possibility to use the second tower likewise as a settling tank. Then, each tower would be available for clearing of one respective principle color.

The water storage 86 is provided with a bottom drain opening 94 which, like in the settling tank, is formed as a transverse shutter.

The mushy consistency in the container 75 can be used, during the production of concrete, as an aggregate substitute as sand or flue dust. This is delivered, as it has been mentioned before, through the conduit 82. The clarified water accumulated in the water storage can be used as in the production of concrete so for rinsing or washing, as a fresh water substitute.

It proved to be advantageous from a technical point of view, at least when the waste water reservoir 12 is filled to a maximum, to withdraw the waste water from the reservoir 12 and deliver it through the conduit 66 in the settling tank 64. In this case the treatment apparatus 10 can be always available for treating the waste water because during the operation of the treatment apparatus 10, the waste water can each time be collected in the waste water reservoir 12.

I claim:

1. A waste water treatment apparatus, comprising:

a waste water reservoir;

a device for circulating the waste water in the reservoir;

a chamber for accumulating an aggregate-containing waste water and for replenishing the waste water reservoir with waste water;

a separator for separating aggregate from the aggregate-containing waste water accumulated in the replenishing chamber;

a settling tank located downstream of the waste water reservoir;

a conduit for directly connecting the waste water reservoir with the settling tank; and conduit means for connecting the settling tank with cement mixing means for supplying a clarified water in the cement mixing means when necessary.

2. An apparatus according to claim 1, comprising a further conduit for connecting the waste water reservoir with the cement mixing means.

3. An apparatus according to claim 1, further comprising a container arranged below the settling tank and into which material accumulated in a bottom region of the settling tank is conducted.

4. An apparatus according to claim 3, further comprising a device for stirring content of the container to provide the content with uniform consistency.

5. An apparatus according to claim 3, further comprising a conduit for connecting the container with the mixing means.

6. An apparatus according to claim 3, further comprising a conduit for connecting the container with the conduit means which connects the settling tank with the mixing means.

7. An apparatus according to claim 1, wherein the conduit means comprises a water storage into which content of an upper region of the settling tank flows when exceeding a predetermined level.

8. An apparatus according to claim 7, further comprising an overflow passage communicating the upper region of the settling tank with the water storage for flowing into the water storage an excess content of the upper region of the settling tank.

9. An apparatus according to claim 7, further comprising a conduit for connecting the water storage with a container located below the settling tank.

10. An apparatus according to claim 7, wherein the conduit means comprises a conduit for connecting the water storage with the mixing means.

11. An apparatus according to claim 1, wherein the settling tank comprises separate, vertically extending first and second regions, and force circulating means for providing of flow of water from above downward in the first region and from beneath upward in the second region.

12. An apparatus according to claim 11, wherein the force circulating means comprises a vertical wall separating the first and second regions.

13. An apparatus according to claim 11, wherein the force circulating means comprises a pipe located inside of the settling tank and opened at a bottom thereof.

14. An apparatus according to claim 1, further comprising a stirrer for keeping a bottom region of the settling tank free from a soiling deposit.

* * * * *